(12) United States Patent
Oggioni et al.

(10) Patent No.: US 10,762,243 B1
(45) Date of Patent: Sep. 1, 2020

(54) SECURE SIGNAL INTEGRITY

(71) Applicant: International Business Machines Corporation, Armonk, NY (US)

(72) Inventors: Stefano Sergio Oggioni, Besana in Brianza (IT); Matteo Cocchini, Long Island City, NY (US); William Santiago-Fernandez, Poughkeepsie, NY (US); Silvio Dragone, Olten (CH); Edward N. Cohen, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/554,674

(22) Filed: Aug. 29, 2019

Related U.S. Application Data

(63) Continuation of application No. 16/364,596, filed on Mar. 26, 2019, now Pat. No. 10,496,851.

(51) Int. Cl.
*G06F 21/75* (2013.01)
*G06F 21/87* (2013.01)
*G06F 21/76* (2013.01)

(52) U.S. Cl.
CPC .............. *G06F 21/75* (2013.01); *G06F 21/76* (2013.01); *G06F 21/87* (2013.01)

(58) Field of Classification Search
None
See application file for complete search history.

(56) References Cited

U.S. PATENT DOCUMENTS

| | | | |
|---|---|---|---|
| 8,687,371 | B2 | 4/2014 | Arshad et al. |
| 9,418,251 | B2 | 8/2016 | Rahimi et al. |
| 9,554,477 | B1 | 1/2017 | Brodsky et al. |
| 2009/0146270 | A1 | 6/2009 | Buer |
| 2014/0337994 | A1 | 11/2014 | Ohsaka |

FOREIGN PATENT DOCUMENTS

WO 2016099644 A1 6/2016

OTHER PUBLICATIONS

Mell et al., "The NIST Definition of Cloud Computing", Recommendations of the National Institute of Standards and Technology, Special Publication 800-145, Sep. 2011, 7 pages.
Oggioni et al., "Secure Signal Integrity", U.S. Appl. No. 16/364,596, filed Mar. 26, 2019, 32 pages.
IBM, "List of IBM Patents or Patent Applications Treated as Related", Appendix P, 2 pages, dated Aug. 29, 2019.

*Primary Examiner* — Jany Richardson
(74) *Attorney, Agent, or Firm* — David K. Mattheis

(57) ABSTRACT

A system to protect signal integrity includes a circuit board having a secure portion and a non-secure portion. The secure portion includes a protected circuit operable for storing security relevant data, and a secure portion power-supply element. The non-secure portion includes an unprotected circuit and a non-secure portion power-supply element corresponding to the secure portion power-supply element. The secure portion and the non-secure portion element are separated by an isolation gap. A coupling element bridges the isolation gap between the secure portion and the non-secure portion. The coupling element is electrically connected to the secure portion power-supply element within the secure portion and electrically connected to the non-secure portion power-supply portion.

20 Claims, 5 Drawing Sheets

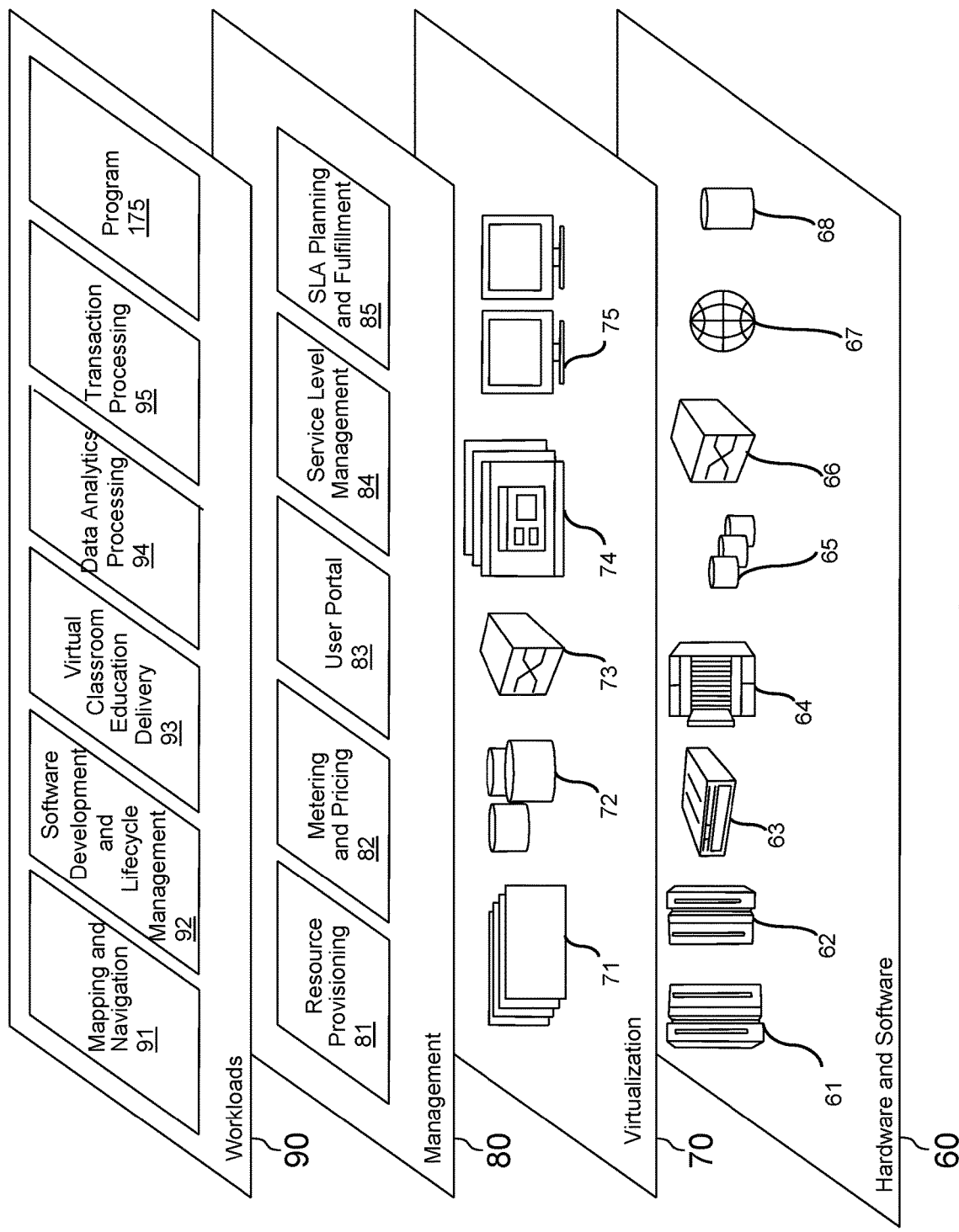

SECURE SIGNAL INTEGRITY

BACKGROUND

The disclosure relates generally to improving secure signal integrity. The disclosure relates particularly to improving signal integrity by providing tamper resistant circuit elements.

Computing devices may include dedicated security hardware, such as Hardware Security Modules, and other protected security circuits. The specialized hardware may provide encryption/decryption functionality and may contain sensitive information such as encryption key values.

Dedicated security hardware necessarily conforms to communications and hardware standards so as to successfully integrate into systems. Standardized communications interfaces, such as the high-speed Peripheral Component Interface Express (PCIe) require that circuit boards be configured with data transmission output traces having the proper electrical properties and matching the input points of the communications buses of the system.

SUMMARY

Aspects of the invention disclose circuit board designs and computer systems associated with improving the integrity of secure signals during system operations. In one aspect integrity may be improved by using a system including a circuit board having a secure portion and a non-secure portion. The secure portion includes a protected circuit operable for storing security relevant data, and a secure portion power-supply element. The non-secure portion includes an unprotected circuit and a non-secure portion power-supply element corresponding to the secure portion power-supply element. The secure portion power-supply element and the non-secure portion power-supply element are separated by an isolation gap. The isolation gap extends around the secure portion within the circuit board. A coupling element bridges the isolation gap between the secure portion and the non-secure portion. The coupling element is electrically connected to the secure portion power-supply element within the secure portion and electrically connected to the non-secure portion power-supply portion.

BRIEF DESCRIPTION OF THE DRAWINGS

FIG. 5 depicts abstraction model layers, according to an embodiment of the invention.

DETAILED DESCRIPTION

Figure 1:
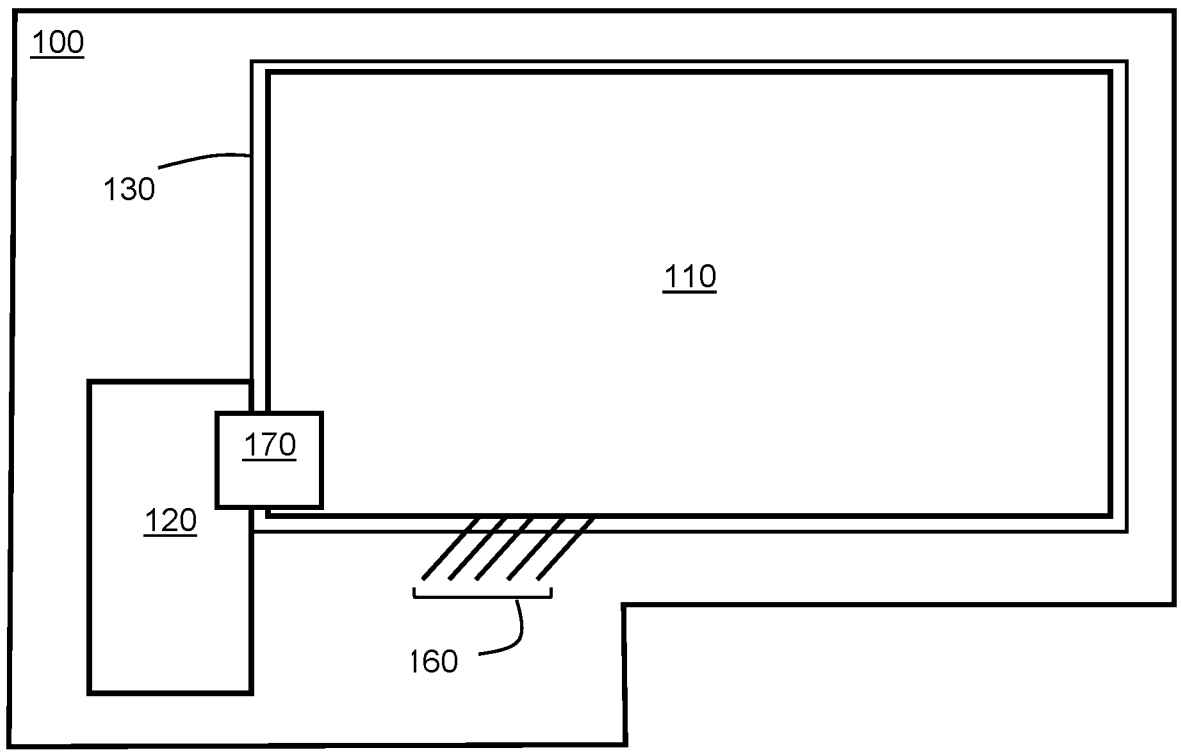
FIG. 1 provides a schematic illustration of a circuit board, according to an embodiment of the invention.

Creating hardware-based security devices requires that the device components and signals be maintained in a secure state while also complying with communications and hardware interface standards. Information and signal security require denying malicious actors access to all aspects of the device handling secure information. Security information may be reverse engineered when adequate access to aspects of the encryption/decryption communications signals is obtained. Even access to ground return signals may be sufficient to determine information about the encryption/decryption methods and associated keys to be of use to the malicious actor, and detrimental to the user. Circuit board design elements complying with communications interface standards while also denying access to all secure signals, even ground return signals, are needed.

In an embodiment, a circuit board comprises a number of discrete portions. Secure portions of the circuit board may comprise protected circuits for encryption/decryption and the storage of encryption key information. Such secure portions of the circuit board may be physically isolated from the non-secure portions of the circuit board by way of an isolation gap surrounding the secure portion of the board. The isolation gap comprises a physical barrier to most interactions between secure and non-secure portions. The isolation gap may be defined as an air gap, or a perimeter of dielectric material disposed adjacent to a perimeter of the secure portion and a perimeter of non-secure portions of the circuit board. In an embodiment, the isolation gap is disposed within the circuit board and surrounds the secure circuit board portion. In an embodiment, the isolation gap is disposed substantially parallel to a planar surface of the circuit board. Necessarily, secure protected circuits must receive power and have a ground return to operate. Power-supply elements must bridge the isolation gap in some manner to provide power to the protected circuits within the secure portion. Such circuits must also have input and output communication ports in order to be functionally of value to the system.

In an embodiment, power-supply elements for the secure and non-secure portions may comprise planar circuit element traces disposed in layers of a multi-layer circuit board in each of the secure and non-secure portions of the printed circuit board. In an embodiment, the power supply elements of the secure and non-secure portions correspond to each other. The power supply elements are part of the same circuit and carry power into and away from the secure portion circuits. In this embodiment, a common ground return element may be disposed in part within the secure portion and in part outside the secure portion, electrically coupling the power supply elements of the two portions. This common ground element may function as the conductive return element of a number of circuits in each of the secure and non-secure portions of the circuit board. The return signals for the secure and non-secure circuits are combined in such an element. Combining signals reduces the likelihood that useful information may be obtained by monitoring the signal. Physical access to such an element may be limited to areas outside the secure portion of the circuit by packaging which encases the entire secure portion of the circuit board. In this manner, any attempt to monitor the return signals will be frustrated by the combined secure and non-secure signals present on the common element.

In an embodiment, attempts to monitor the combined signals may be further frustrated by disposing the common element in an internal layer of a multi-layer circuit board as is known in the art. In this embodiment, external layers of dielectric materials serve as physical barriers to any effort to monitor return signals by accessing the common ground element disposed across the isolation gap. In an embodiment, the common ground return is inaccessible for monitoring even in the non-secure portions of the circuit board.

In an embodiment, the common ground return may be disposed entirely within the secure portion of the circuit board. In this embodiment, ground traces associated with unprotected circuits of the non-secure portion may be routed into the secure portion for connecting to the common ground return. In this embodiment, the common ground carrying both protected and unprotected circuit return signals is then routed from the secure portion to a main circuit board ground rail. In an embodiment, all traces described above may be disposed on an internal layer of a multi-layer board.

In an embodiment, the circuit board may further comprise a high-speed communications bus or transmission line. Examples include a Peripheral Component Interface (PCI) or Peripheral Component Interface Express (PCIe) communications bus. Such a link carries information at alternating current (AC) frequencies in excess of 30 kilohertz (kHz). The design of such high-speed lines must conform to geometric rules and standards to achieve the electrical impedance necessary for the lines to function properly as part of the overall system communications bus. The information signal carried by the communications bus comprises AC and direct current (DC) portions. The AC and DC portions of the signal may be separated and returned using separate ground paths to complete the overall circuit. (Note: the term(s) "PCI" and "PCIe" may be subject to trademark rights in various jurisdictions throughout the world and are used here only in reference to the products or services properly denominated by the marks to the extent that such trademark rights may exist.)

In an embodiment, the AC portion may be returned over ground path comprising one or more AC coupling elements such as capacitors. The capacitors may be disposed such that the gaps of the capacitors align with the isolation gap of the circuit board in the area between aligned secure and non-secure power-supply elements. In an embodiment, the routing of the isolation gap upon the circuit board may be altered away from the perimeter of the secure portion to a location within the secure portion. In an embodiment, the width of the isolation gap within the secure portion may be narrowed to match the gap of a capacitor sized according to the transmission frequency of the communications bus. Capacitors may be disposed bridging the isolation gap for each trace of a multi-trace transmission line circuit. In an embodiment, the capacitors for the "low", "negative", "$V_{DD}$" or ground voltage return traces may be disposed adjacent to the "high", or "positive", "$V_{SS}$", voltage signal traces. In this embodiment, the respective lengths of the high and low voltage traces are maintained relatively equal to one another.

In an embodiment, each capacitor functions as a coupling short circuit, or a direct wire connection, when the AC portion of the signal is transmitted through the capacitor. In this embodiment, the AC portion of an encrypted signal may be passed from the secure portion to the non-secure portion. Concern for external monitoring of the combination of the AC and DC portions of the signal to correlate features between the two types of signals in an effort to extract secure information from the overall signal stream is diminished as the AC and DC signals are separated.

In an embodiment, the common DC ground element bridging the isolation gap may be disposed non-adjacent to the high-speed AC traces in addition to being disposed within an internal layer of the circuit board. Physically separating the ground paths of the AC and DC portions further enhances the overall security of the signals. In this embodiment, the common ground element may serve as the DC coupling return path for pluralities of secure and non-secure circuits rendering the overall signal "noisy" and harder to correlate to the AC signals.

The disclosed embodiments may be incorporated into hardware security modules provided as external units. The disclosed embodiments may also be incorporated into circuit boards intended for use as internal system components connected to the system by way of known communications protocols. Circuit boards comprising the disclosed embodiments may be designed and fabricated using known circuit board design and fabrication methods.

FIG. 1 provides a schematic illustration of a circuit board according to an embodiment of the invention. As illustrated in the figure, circuit board 100 includes secure portion 110, generally surrounded by isolation gap 130. A least part of isolation gap 130 is defined by the perimeters of secure portion 110 and non-secure portion 120. A common ground return element 170, bridges the isolation gap in one layer of the circuit board. Common ground element 170 serves as a return path for a plurality of secure and non-secure circuits (not shown). High-speed transmission line traces 160 are disposed across the isolation gap away from common ground element 170.

Figure 2A:
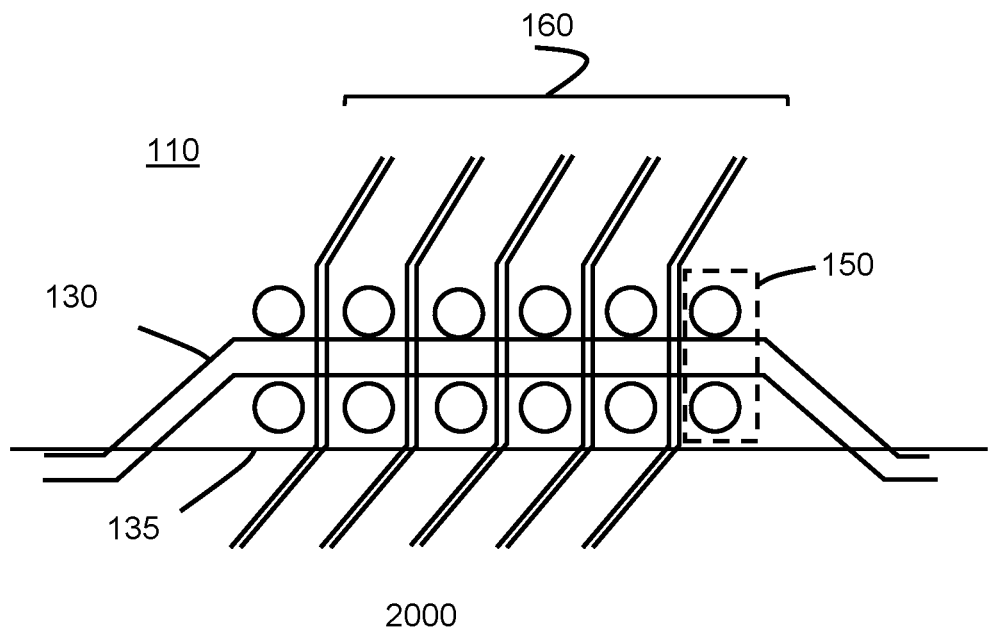
FIG. 2a provides a schematic illustration of a portion of a circuit board, according to an embodiment of the invention.

As shown in FIG. 2a, circuit board portion 2000, includes high-speed transmission line traces 160 cross isolation gap 130 at the boundary 135 of the secure portion 110 of the circuit board. Capacitors are disposed in close proximity to the high-speed transmission line traces 160 and isolation gap 130, serving as couplers to allow the AC portion of the high-speed communications signals a return path.

Figure 2B:
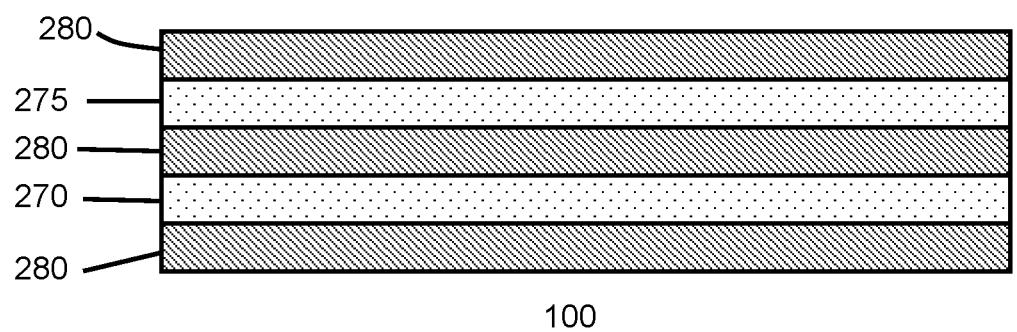
FIG. 2b provides a schematic cross-section of a circuit board, according to an embodiment of the invention.

FIG. 2b provides a cross sectional view of a portion of circuit board 100 in the area of common ground element 270. As shown in the figure, common ground element 270 is disposed between dielectric layers 280 denying access for signal monitoring efforts. Layer 275 illustrates a high voltage trace layer complementing the common ground element 270.

Figure 3:
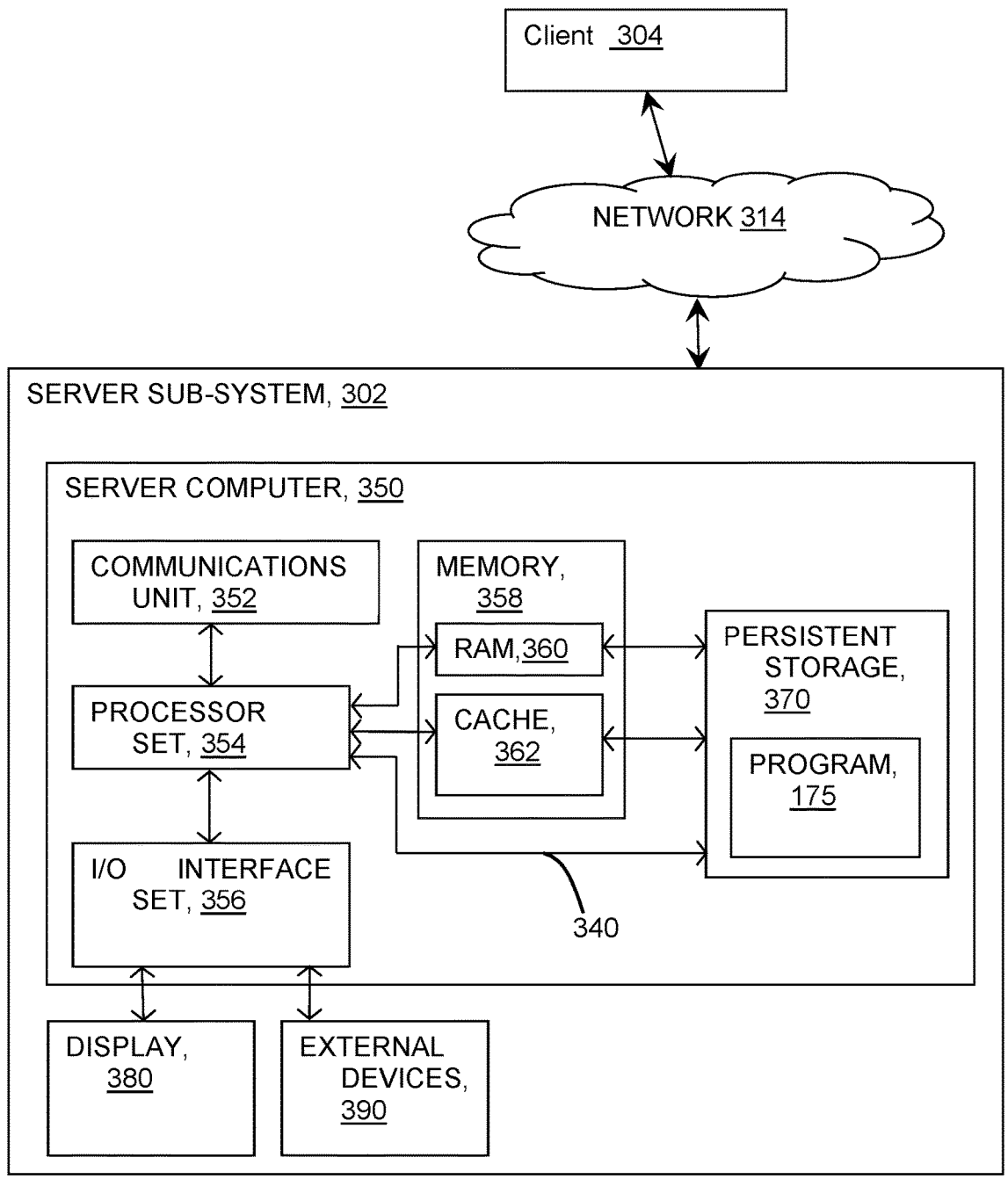
FIG. 3 depicts a networked computing system, according to an embodiment of the invention.

FIG. 3 provides a schematic illustration of exemplary network resources associated with practicing the disclosed inventions. The inventions may be practiced in the processors of any of the disclosed elements which process an instruction stream. As shown in the figure, a networked Client device 304 connects wirelessly to server sub-system 302 via network 314. Client devices 304 comprise software programs (not shown) together with sufficient computing resource (processor, memory, network communications hardware) to execute the programs. As shown in FIG. 3, server sub-system 302 comprises a server computer 350. FIG. 3 depicts a block diagram of components of server computer 350 within a networked computer system 3000, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 350 can include processor(s) 354, cache 362, memory 358, persistent storage 370, communications unit 352, input/output (I/O) interface(s) 356 and communications fabric 340. Communications fabric 340 provides communications between cache 362, memory 358, persistent storage 370, communications unit 352, and input/output (I/O) interface(s) 356. Communications fabric 340 can be implemented with any architecture designed for passing data and/or control information between processors (such as microprocessors, communications and network processors, etc.), system memory, peripheral devices, and any other hardware components within a system. For example, communications fabric 340 can be implemented with one or more buses.

Memory 358 and persistent storage 370 are computer readable storage media. In this embodiment, memory 358 includes random access memory (RAM) 360. In general, memory 358 can include any suitable volatile or non-volatile computer readable storage media. Cache 362 is a fast memory that enhances the performance of processor(s) 354 by holding recently accessed data, and data near recently accessed data, from memory 358.

Program instructions and data used to practice embodiments of the present invention, e.g., the software program 175, are stored in persistent storage 370 for execution and/or access by one or more of the respective processor(s) 354 of server computer 350 via cache 362. In this embodiment, persistent storage 370 includes a magnetic hard disk drive. Alternatively, or in addition to a magnetic hard disk drive, persistent storage 370 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 370 may also be removable. For example, a removable hard drive may be used for persistent storage 370. Other examples include optical and magnetic disks, thumb drives, and smart cards that are inserted into a drive for transfer onto another computer readable storage medium that is also part of persistent storage 370.

Communications unit 352, in these examples, provides for communications with other data processing systems or devices, including resources of client computing device 304. In these examples, communications unit 352 includes one or more network interface cards. Communications unit 352 may provide communications through the use of either or both physical and wireless communications links. Software distribution programs, and other programs and data used for implementation of the present invention, may be downloaded to persistent storage 370 of server computer 350 through communications unit 352.

I/O interface(s) 356 allows for input and output of data with other devices that may be connected to server computer 350. For example, I/O interface(s) 356 may provide a connection to external device(s) 390 such as a keyboard, a keypad, a touch screen, a microphone, a digital camera, and/or some other suitable input device. External device(s) 390 can also include portable computer readable storage media such as, for example, thumb drives, portable optical or magnetic disks, and memory cards. Software and data used to practice embodiments of the present invention, e.g., software program 175 on server computer 350, can be stored on such portable computer readable storage media and can be loaded onto persistent storage 370 via I/O interface(s) 356. I/O interface(s) 356 also connect to a display 380.

Display 380 provides a mechanism to display data to a user and may be, for example, a computer monitor. Display 380 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
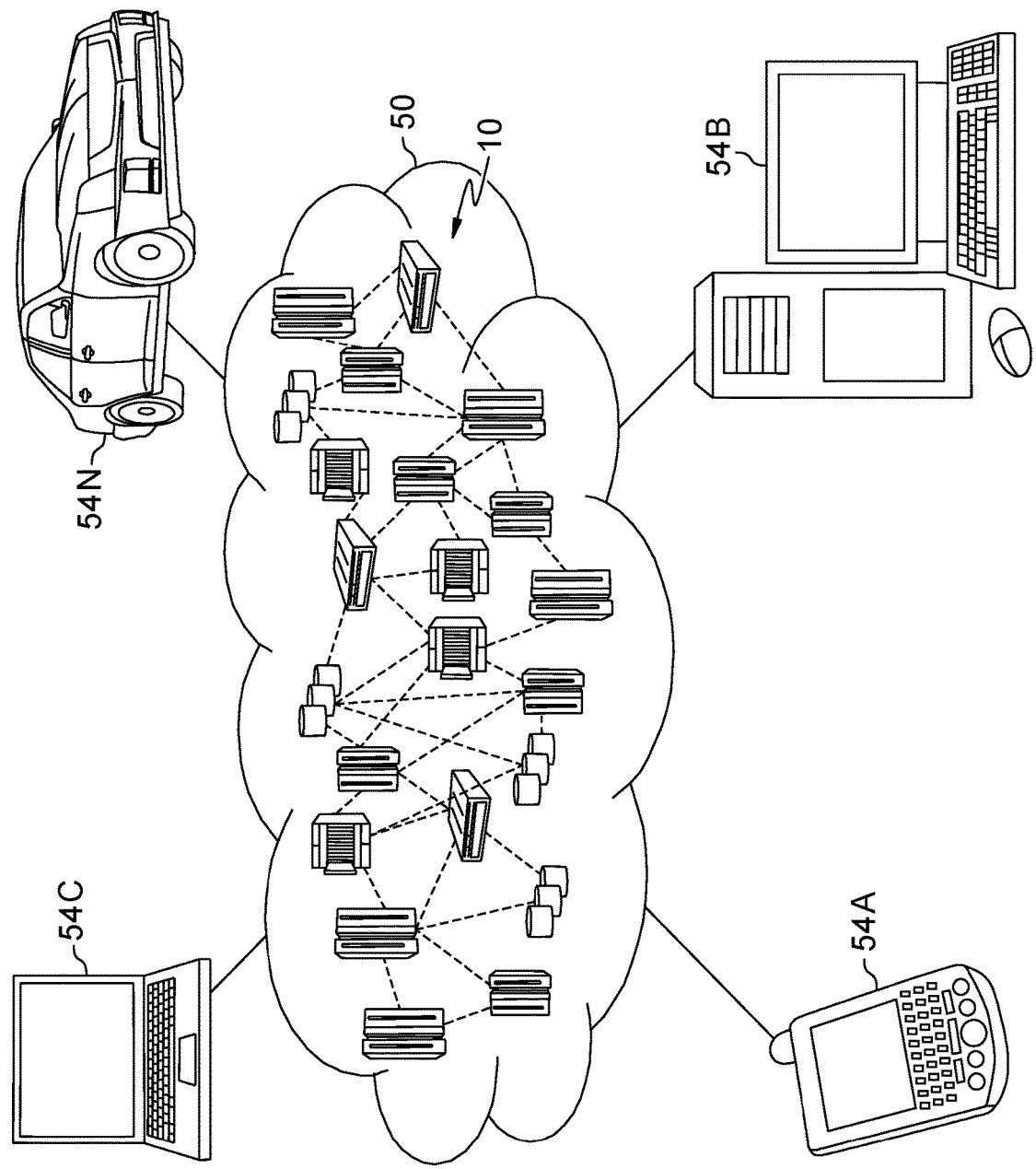
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A circuit board comprising:
   a secure portion comprising a protected circuit operable for storing security relevant data and a secure portion power-supply element;
   a non-secure portion comprising an unprotected circuit and a non-secure portion power-supply element corresponding to the secure portion power-supply element;
   wherein the secure portion and non-secure portion are separated by an isolation gap, the isolation gap defined at least in part according to a secure portion perimeter;
   a coupling element bridging the isolation gap between the secure portion and the non-secure portion, the coupling element electrically connected to the secure portion power-supply element within the secure portion and electrically connected to the non-secure portion power-supply element; and
   non-secure portion ground traces routed in the secure portion and connected to secure circuit common ground traces.

2. The circuit board according to claim 1 further comprising:
   a high-speed transmission line connecting the secure portion and the non-secure portion circuit.

3. The circuit board according to claim 1, wherein the coupling element comprises:
   an alternating current (AC) coupling element disposed in electrical communication with the secure portion power-supply element and the non-secure portion power-supply element, the AC coupling element electrically conductive to an alternating current portion of a signal carried upon the power-supply elements.

4. The circuit board according to claim 3 wherein the AC coupling element comprises a capacitor bridging the isolation gap.

5. The circuit board according to claim 4, further comprising a high-speed transmission line connecting the secure portion and the non-secure portion circuit, wherein the capacitor is disposed adjacent to the high-speed transmission line.

6. The circuit board according to claim 1, further comprising:
　a direct current (DC) coupling element disposed in electrical communication with the secure portion power-supply element and the non-secure power-supply element, the DC coupling element electrically conductive to a direct current portion of a signal carried upon the power-supply elements.

7. The circuit board according to claim 6, further comprising a high-speed transmission line connecting the secure portion and the non-secure portion circuit, wherein the DC coupling element is disposed at a location non-adjacent to the high-speed transmission line.

8. The circuit board according to claim 6, wherein the DC coupling element comprises electrical communication links with a plurality of secure portion circuits.

9. The circuit board according to claim 6, wherein the DC coupling element is disposed in an internal layer of the circuit board.

10. A computer system comprising a circuit board, the circuit board comprising:
　a secure portion, the secure portion comprising a protected circuit operable for storing security relevant data, and a secure portion power-supply element;
　a non-secure portion comprising an unprotected circuit and a non-secure portion power-supply element corresponding to the secure portion power-supply element;
　wherein the secure portion and non-secure portion are separated by an isolation gap;
　a coupling element bridging the isolation gap between the secure portion and the non-secure portion, the coupling element electrically connected to the secure portion power-supply element within the secure portion and electrically connected to the non-secure portion power-supply element; and
　non-secure portion ground traces routed in the secure portion and connected to secure circuit common ground traces.

11. The computer system according to claim 10, further comprising:
　a high-speed transmission line connecting the secure portion and the non-secure portion.

12. The computer system according to claim 10, wherein the coupling element comprises:
　an AC coupling element disposed in electrical communication with the secure portion power-supply element and the non-secure portion power-supply element, the AC coupling element electrically conductive to an alternating current portion of a signal carried upon the power-supply elements.

13. The computer system according to claim 12, wherein the AC coupling element comprises a capacitor bridging the isolation gap.

14. The computer system according to claim 13, further comprising a high-speed transmission line connecting the secure portion and the non-secure portion circuit, wherein the capacitor is disposed adjacent to the high-speed transmission line.

15. The computer system according to claim 10, further comprising:
　a DC coupling element disposed in electrical communication with the secure portion power-supply element and the non-secure portion power-supply element, the DC coupling element electrically conductive to a direct current portion of a signal carried upon the power-supply elements.

16. The computer system according to claim 15, further comprising a high-speed transmission line connecting the secure portion and the non-secure portion circuit, wherein the DC coupling element is disposed at a location non-adjacent to the high-speed transmission line.

17. The computer system according to claim 15, wherein the DC coupling element comprises electrical communication links with a plurality of secure portion circuits and a plurality of non-secure portion circuits.

18. The computer system according to claim 15, wherein the DC coupling element is disposed in an internal layer of the circuit board.

19. A computer system comprising a circuit board, the circuit board comprising:
　a secure portion, the secure portion comprising a protected circuit operable for storing security relevant data, and a secure portion power-supply element;
　a non-secure portion comprising an unprotected circuit and a non-secure portion power-supply element corresponding to the secure portion power-supply element;
　wherein the secure portion power-supply element and non-secure portion power-supply element are separated by an isolation gap;
　an AC coupling element disposed in electrical communication with the secure portion power-supply element within the secure portion, and in electrical communication with the non-secure portion power-supply element within the secure portion, the AC coupling element electrically conductive to an alternating current portion of a signal carried upon the power-supply elements;
　a DC coupling element disposed in electrical communication with the secure portion power-supply element within the secure portion and in electrical communication with the non-secure portion power-supply element within the non-secure portion, the DC coupling element electrically conductive to a direct current portion of a signal carried upon the power-supply elements; and
　non-secure portion ground traces routed in the secure portion and connected to secure circuit common ground traces.

20. The computer system according to claim 19, further comprising a high-speed transmission line connecting the secure portion and the non-secure portion.

* * * * *